United States Patent
Anderson et al.

(10) Patent No.: US 12,227,041 B2
(45) Date of Patent: Feb. 18, 2025

(54) POWERED ARM LIFTER SYSTEM AND METHOD OF AUTOMATING WEIGHT DISTRIBUTION

(71) Applicant: Progress Mfg. Inc., Provo, UT (US)

(72) Inventors: Jed K. Anderson, Lindon, UT (US); David F. Lundgreen, Spanish Fork, UT (US); Jason R. Harper, Spanish Fork, UT (US)

(73) Assignee: Progress Mfg. LLC, Provo, UT (US)

( * ) Notice: Subject to any disclaimer, the term of this patent is extended or adjusted under 35 U.S.C. 154(b) by 183 days.

(21) Appl. No.: 17/827,487

(22) Filed: May 27, 2022

(65) Prior Publication Data

US 2023/0070869 A1 Mar. 9, 2023

Related U.S. Application Data

(63) Continuation-in-part of application No. 17/578,332, filed on Jan. 18, 2022, now abandoned, which is a continuation of application No. 17/468,547, filed on Sep. 7, 2021, now abandoned.

(51) Int. Cl.
*B60D 1/24* (2006.01)
*B60D 1/26* (2006.01)
*B60D 1/46* (2006.01)
*B60D 1/62* (2006.01)

(52) U.S. Cl.
CPC ............. *B60D 1/247* (2013.01); *B60D 1/26* (2013.01); *B60D 1/465* (2013.01); *B60D 1/62* (2013.01)

(58) Field of Classification Search
CPC ... B60D 1/06; B60D 1/26; B60D 1/62; B60D 1/247; B60D 1/248; B60D 1/167; B60D 1/465
USPC ...................................................... 280/405.1
See application file for complete search history.

(56) References Cited

U.S. PATENT DOCUMENTS

| | | | |
|---|---|---|---|
| 4,253,680 A | 3/1981 | Albright | |
| 5,580,076 A | 12/1996 | DeRoule | |
| 5,823,558 A | 10/1998 | Shoquist | |
| 7,934,742 B2 | 5/2011 | Anderson | |
| 9,522,582 B2 | 12/2016 | Cullen | |
| 2008/0277903 A1* | 11/2008 | Anderson | B60D 1/30 280/504 |
| 2019/0232740 A1 | 8/2019 | Anderson | |
| 2020/0108678 A1 | 4/2020 | Pierce | |
| 2020/0317212 A1 | 10/2020 | Rogness | |
| 2020/0406693 A1 | 12/2020 | Hall | |
| 2021/0094370 A1 | 4/2021 | McAllister | |
| 2021/0094371 A1* | 4/2021 | McAllister | B60D 1/247 |
| 2021/0170819 A1 | 6/2021 | Doman | |

(Continued)

*Primary Examiner* — Kevin Hurley
*Assistant Examiner* — Felicia L. Brittman-Alabi
(74) *Attorney, Agent, or Firm* — McGarry Bair PC

(57) ABSTRACT

A system for powered trailer weight distribution having a hitch mount with a spring bar, and a trailer with a spring bar mount disposed on the trailer and having an initial position relative to the trailer, wherein the spring bar mount is configured to receive and engage the spring bar, and a weight distribution actuator configured and arranged to adjust a position of the spring bar mount relative to the spring bar while engaged with the spring bar, wherein the weight distribution actuator is connected to a power source that provides power to the weight distribution actuator, facilitating the adjustment of the position of the spring bar mount.

33 Claims, 15 Drawing Sheets

(56) References Cited

U.S. PATENT DOCUMENTS

2021/0260940 A1    8/2021   Hall
2021/0260941 A1    8/2021   Hall

* cited by examiner

POWERED ARM LIFTER SYSTEM AND METHOD OF AUTOMATING WEIGHT DISTRIBUTION

CROSS-REFERENCE TO RELATED APPLICATIONS

This application is a continuation-in-part of U.S. patent application Ser. No. 17/578,332, filed on Jan. 18, 2022, which is a continuation of U.S. patent application Ser. No. 17/468,547, filed on Sep. 7, 2021, which are hereby incorporated by reference herein in their entirety, including but not limited to those portions that specifically appear hereinafter, the incorporation by reference being made with the following exception: in the event that any portion of the above-referenced applications is inconsistent with this application, this application supersedes said above-referenced applications.

STATEMENT REGARDING FEDERALLY SPONSORED RESEARCH OR DEVELOPMENT

Not applicable.

BACKGROUND

1. The Field of the Present Disclosure

The present disclosure relates generally to trailer weight distribution hitch systems, and more particularly, but not necessarily entirely, to trailer hitch systems for measuring the weight and resulting forces exerted by a trailer while using a weight distribution mechanism and adjusting a weight distribution system to account for changes in trailer and vehicle loading.

2. Description of Related Art

It should be appreciated that the correct balance of a trailer load is necessary for safe towing. When towing a trailer, the tow vehicle often sags in the rear and raises in the front. The weight of the trailer on the rear of the tow vehicle can cause the rear tires and axle to carry a significant majority of the percent of the load of the trailer tongue, also known as tongue weight, and can also result in a transfer of some of the weight from the front of the tow vehicle itself, to the rear axle of the tow vehicle. This unbalanced loading can cause an unsafe driving situation.

Unbalanced loading can reduce steering and braking capabilities in the tow vehicle and in extreme situations it can cause accelerated wear to the mechanical components of the tow vehicle and trailer, and compromise the performance of the tow vehicle.

To aid in mitigating this type of unbalanced loading, people often purchase hitches that operate to transfer some of the weight from the rear axle of the tow vehicle to the front axle of the tow vehicle. This operation is referred to in the field as "weight distribution," and the phrase "weight distribution" as used herein, shall therefore refer to the operation of transferring some of the weight from the rear axle of the tow vehicle to the front axle of the tow vehicle. However, when towing a trailer it can be difficult for a user to know if they have achieved correct weight distribution. Further, as trailers are constantly being loaded differently, a previously correct weight distribution setup may not remain optimal and need to be reevaluated and adjusted accordingly.

The prior art is characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
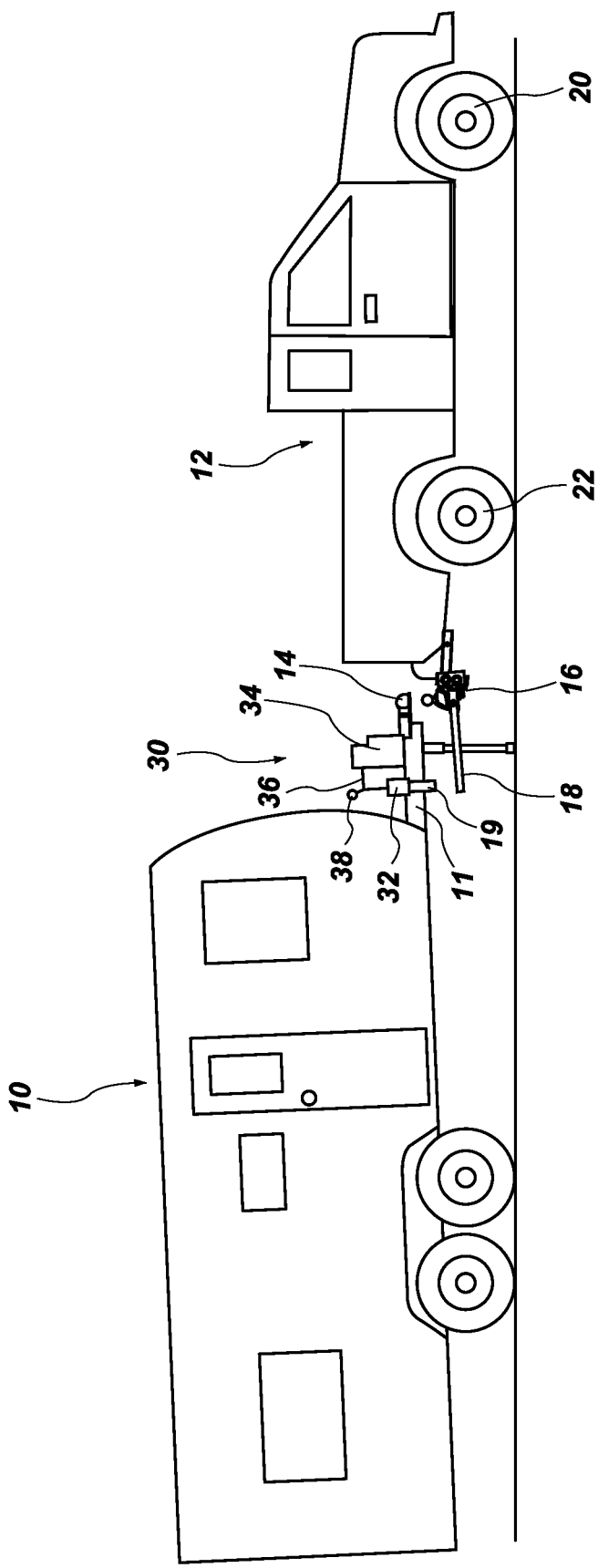
FIG. 1 is a side view of a schematic of the disclosed weight distribution system.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered an improved system and method for activating a power armed lifter or weight distribution actuator to adjust or engage a weight distribution mechanism, whereby the improved system may be manually or remotely activated to adjust the weight distribution mechanism and more evenly distribute vehicle weight over both axles of the vehicle. The phrase "weight distribution" as used herein, shall refer to the operation of transferring some of the tow vehicle weight from the rear axle of the tow vehicle to the front axle of the tow vehicle when towing a trailer.

The generally accepted safe and proper tongue weight is roughly 10 to 15 percent of the total loaded trailer weight. The load of a trailer should also be properly balanced to achieve a tongue weight within the safe and proper range.

FIGS. 1-6 illustrate a first disclosed embodiment of a powered arm lifter or powered weight distribution system for facilitating a more safely distributed load on a tow vehicle. Specifically, FIG. 1 illustrates a trailer 10 and a tow vehicle 12. The trailer 10 may include a tongue 14 configured to receive a trailer hitch 16 attached to the tow vehicle 12. The trailer 10 may also include a trailer frame 11, and the tongue 14 may be attached to the trailer frame 11. The trailer hitch 16 may also include a weight distribution mechanism having at least one spring bar, or a plurality of spring bars 18, such as a pair of spring bars, for example, designed and configured to engage or bias against corresponding spring bar mounts 19 to more evenly distribute the load from the trailer 10 over the axles of the tow vehicle 12, as opposed to placing all or most of the load of the trailer's tongue weight on the rear axle of the tow vehicle 12. The spring bar mounts 19 may be attached to or otherwise disposed on or confined to movement with the trailer frame 11. It is to be understood that the concept of the spring bar mounts 19 being disposed on the trailer 10 or trailer frame 11 shall be construed such that the phrase "disposed on" covers broadly the concept of spring bar mounts 19 being either directly attached to the trailer 10 or the trailer frame 11 or otherwise not directly attached to the trailer 10 or the trailer frame 11, but confined to movement with the trailer 10 or the trailer frame 11. It is to be further understood that the trailer 10 may include the trailer frame 11, it is also to be understood that the trailer 10 and the trailer frame 11 may be separate and distinct elements. FIG. 1 illustrates the trailer 10 and tow vehicle 12 before the trailer 10 has been loaded onto the tow vehicle 12. Also shown in FIG. 1 is that the tow vehicle 12 at a base line, meaning the chassis of the vehicle is substantially balanced between the front wheels 20, or front axle, and the rear wheels 22, or rear axle.

FIG. 1 also illustrates a spring bar or weight distribution actuator 30 that can be connected to each of the spring bar mounts 19 and configured to actuate or adjust the position of the spring bar mounts 19, in any desired direction, such as, for example, vertically, or substantially vertically, or up and down, or substantially horizontally, or at any other desired angle, such that when the spring bars 18 are engaged with the corresponding spring bar mounts 19, the weight distribution actuator 30 can bias or, increase or decrease, the pressure, or torque or force or load angle, on the spring bars 18 which may also change the amount of weight being distributed from the rear axle of the tow vehicle 12 to the front axle of the tow vehicle 12. In alternative embodiments also disclosed herein, the weight distribution actuator 30 may also be configured to bias, or apply torque, to the spring bars 18 in horizontal or substantially horizontal directions, or at any other desired angle between vertical and horizontal.

Additionally, as described in further detail below, it is to be understood that the mount actuator 32 can apply a force in any desired direction. Such an actuation may cause a repeatable, controllable change in the amount of weight distribution applied to the vehicle/trailer combination.

As illustrated in FIGS. 1-6, the weight distribution actuator 30 may include a mount actuator 32 in fluid, mechanical, pneumatic, or electrical communication with a pressure actuator, or power source 34 that may be configured to provide power to and facilitate movement of the mount actuator 32, in a vertical or substantially vertical direction, or generally up and down. The weight distribution actuator 30 may be permanently or temporarily mounted to the trailer 10 and may be powered by any desired mechanism, such as a battery, fuel, or electrical power or other known or desired power source.

The mount actuator 32 may be an air bag mechanism that includes bellows 33 that when deflated, may be housed within a housing 35. The bellows 33 may be attached or secured to an end portion of the spring bar mount 19, such that as the bellows move up and down, during inflation and deflation of the bellows 33, the spring bar mount 19 with correspondingly also move up and down, substantially vertically. Accordingly, as the bellows 33 inflate, the mount actuator may actuate vertical movement of the spring bar mounts 19, with upward vertical movement being facilitated by increased pressure of the bellows 33 and downward vertical movement of the spring bar mounts 19 facilitated by reduced pressure within the bellows 33.

The mount actuator 32 may alternatively be any desired mechanism that can provide generally upward, downward, horizontal, or angular movement of the spring bar mounts 19, such as, for example, pneumatic, hydraulic, mechanical or electric powered piston or other vertical or horizontal actuation device or mechanism. Examples of additional or alternative pressure actuators and mount actuators are provided below with respect to FIGS. 7-10.

The power source 34 may be in fluid, mechanical or electrical communication with the mount actuator 32 via a pressure or power line 36. The line 36, may for example, provide fluid pressure, such as air or hydraulic fluid for example, to the mount actuator 32 to actuate inflation of the bellows 33 which may facilitate the desired movement. The line 36 may include a release valve 38, or dump valve or any other desired pressure or power release mechanism. The release valve 38 may be actuated to release air pressure, hydraulic pressure, or other desired power level, to adjust the mount actuator 32 to a lower pressure or power level, thereby lowering the position of the corresponding spring bar mount 19. The release valve 38 may be manually actuated or may be connected to an electric actuation system, such as a remote actuation system described in an additional embodiment below.

Figure 2:
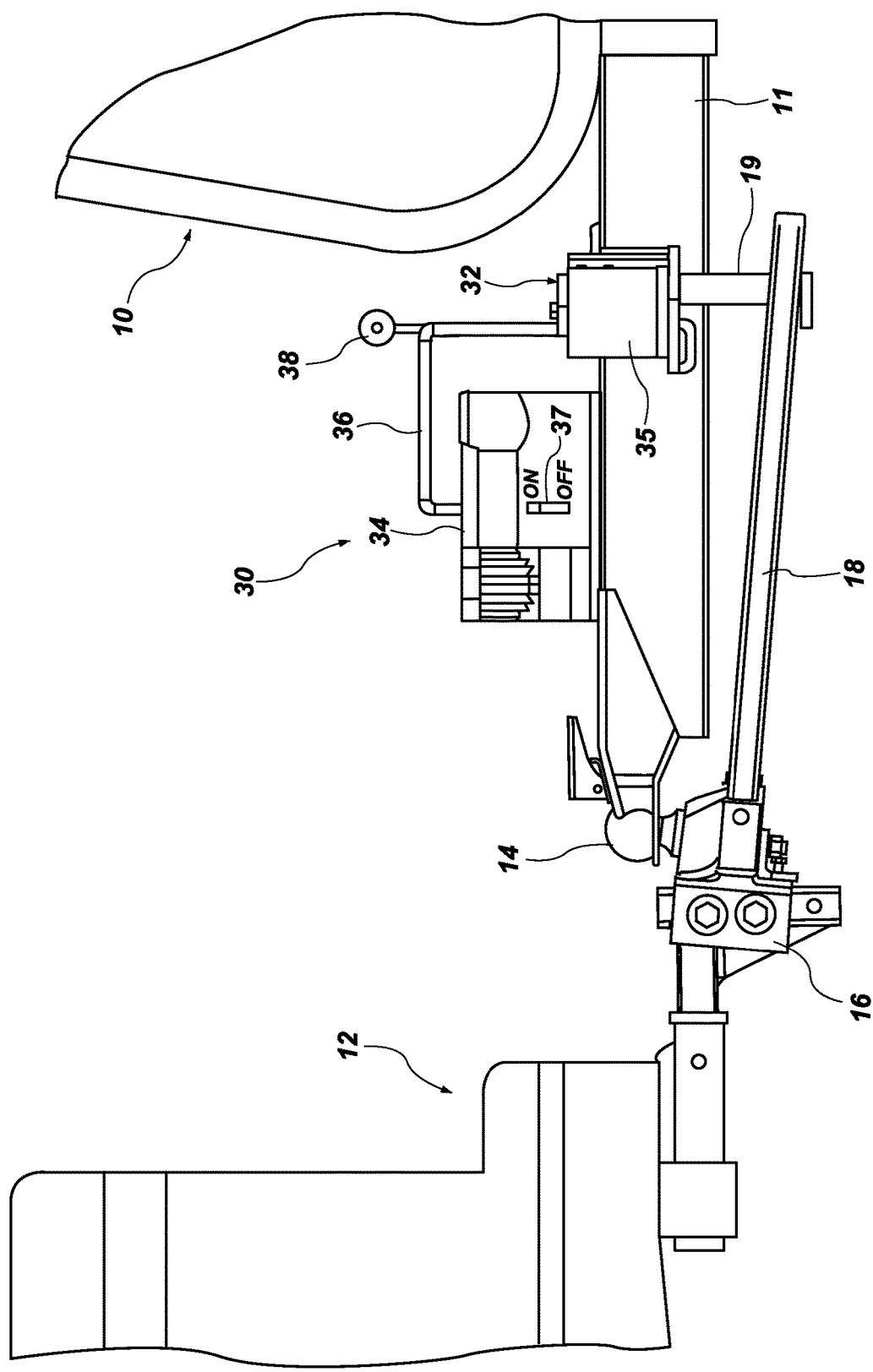
FIG. 2 is a perspective view of the disclosed weight distribution system.

FIG. 2, illustrates the trailer 10 and tow vehicle 12 after the trailer 10 is loaded onto the tow vehicle 12, but before engagement of the spring bars or weight distribution mechanism 18. Also shown in FIG. 2 is the tow vehicle 12 in a loaded state, meaning the trailer hitch 16 and rear wheels 22 may be holding all or the substantial majority of the tongue weight of the trailer 10 and some of the load of from the front axle of the tow vehicle 12, causing the chassis of the vehicle 12 to substantially tilt toward the rear of the vehicle 12, causing the front of the vehicle 12 to raise up from the front wheels 20, or front axle.

Figure 3:
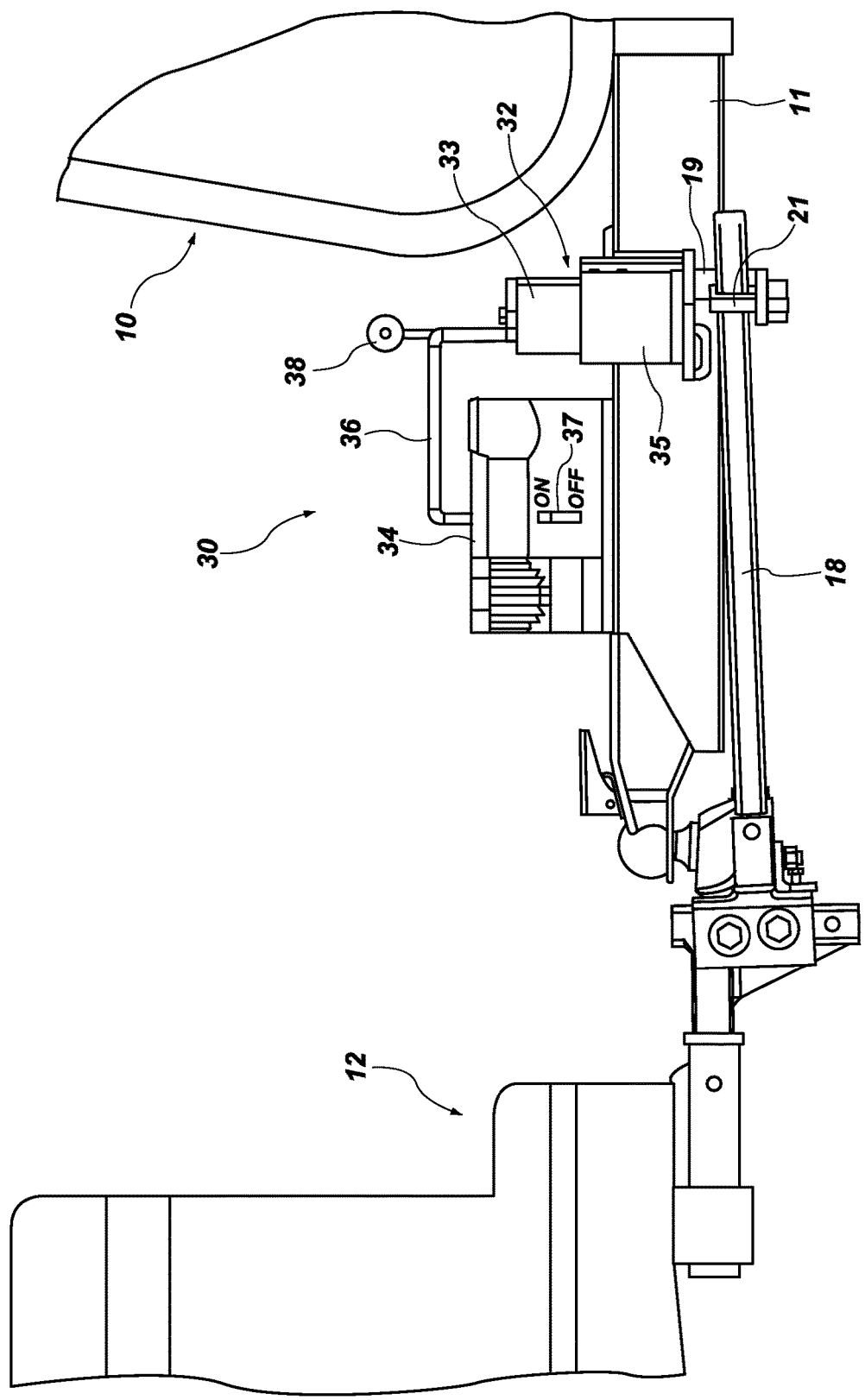
FIG. 3 is a perspective view of the disclosed weight distribution system.

FIG. 3 illustrates the trailer 10 and tow vehicle 12 after the trailer 10 is loaded onto the tow vehicle 12, and after engagement of the spring bars or weight distribution mechanism 18. Also shown in FIG. 3 is when the weight distribution mechanism 18 is engaged, the weight of the trailer 10 previous carried by the rear axle 22 is more evenly distributed over the axles of the chassis of the vehicle 12.

As illustrated in FIGS. 2 and 3, the power source 34, such as an air compressor, for example, may include a power switch 37 which can enable a user to manually activate the power source 34 to increase the pressure or power directed to the mount actuator 32. When a desired spring bar mount 19 position is achieved, the user can disengage or turn off the power source 34, which can then freeze or substantially hold steady the pressure or power provided to the mount actuator 32, thereby holding the mount actuator 32 and corresponding spring bar mount 19 in position. When a user would like to lower the position of the spring bar mount 19, the user can simple activate the pressure release valve 38, which can then reduce the pressure or power to the mount actuator 32, which can then lower the spring bar mount 19. This actuation of the power source 34 and/or pressure release valve 38 can occur while the spring bar 18 is engaged with the spring bar mount 19.

The spring bar mount 19 may also include a retention pin 21, that may be inserted or engaged with an end portion of the spring bar mount 19, such that the spring bar 18 may be retained between the retention pin 21 and the spring bar mount 19. The spring bar mount 19 may also include lock mechanism, or locking pin, that my be engaged, such that when the spring bar mount 19 is in a desired position, a user can lock the spring bar mount 19 in place, independent of the pressure or power levels of the mount actuator 32. This lock mechanism can be utilized to reduce or prevent bleed off of pressure or power in the mount actuator 32 and can also reduce wear and tear or other deterioration of the mount actuator 32 and/or power source 34 because these mechanisms may not need to maintain the pressure or power during use.

Additionally, the mount actuator 32 may yield the benefit of creating or facilitating a damping system, as the vehicle 12 and trailer 10 are traveling or in use the pressure or power in the mounting actuator 32 can absorb, at least in part, small fluctuations in changes in weight distribution or loads, for example, when traveling over rocks, pot holes, or other obstructions in a road than may cause temporary fluctuations in weight distribution.

Figure 4:
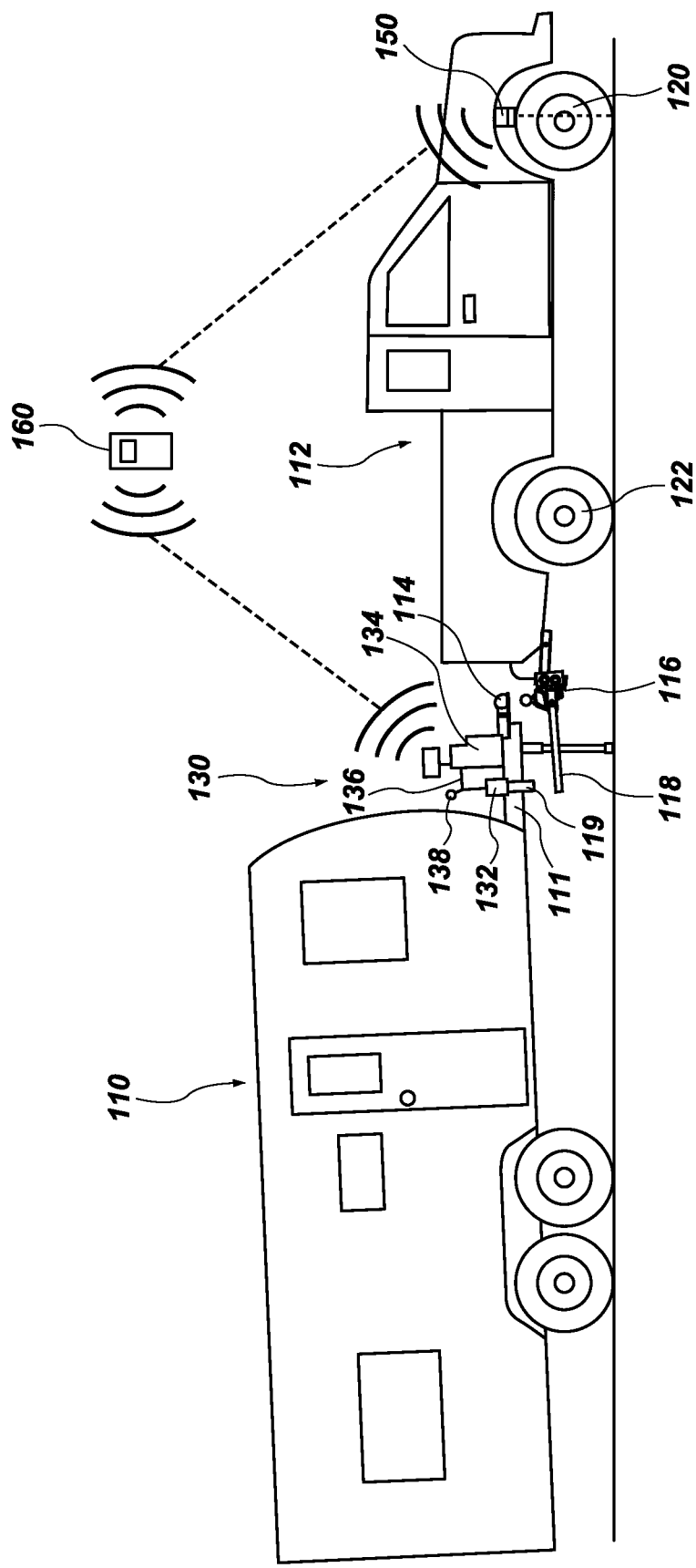
FIG. 4 is a side view of a schematic of another disclosed weight distribution system.
Figure 5:
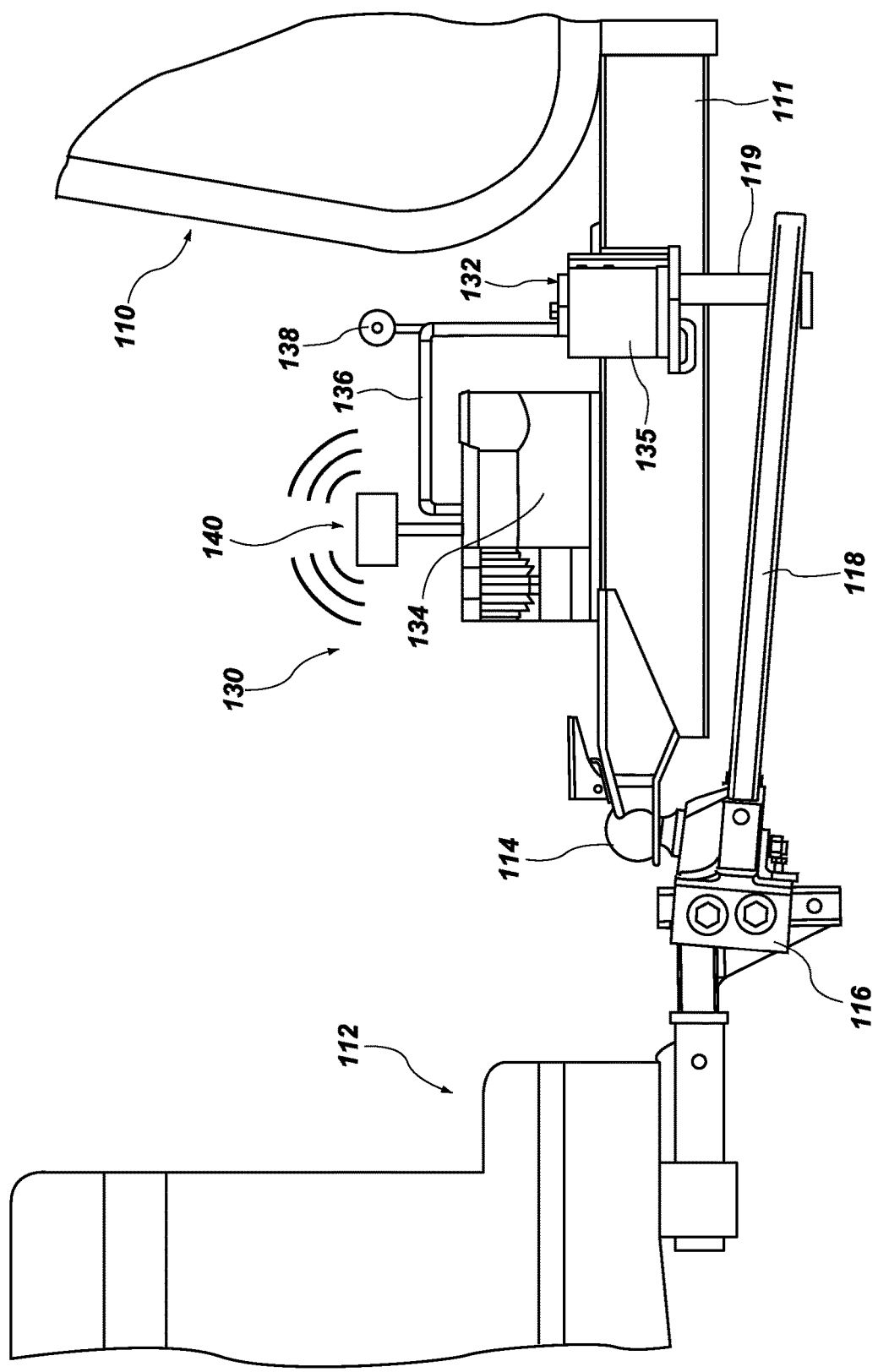
FIG. 5 is a perspective view of the disclosed weight distribution system.
Figure 6:
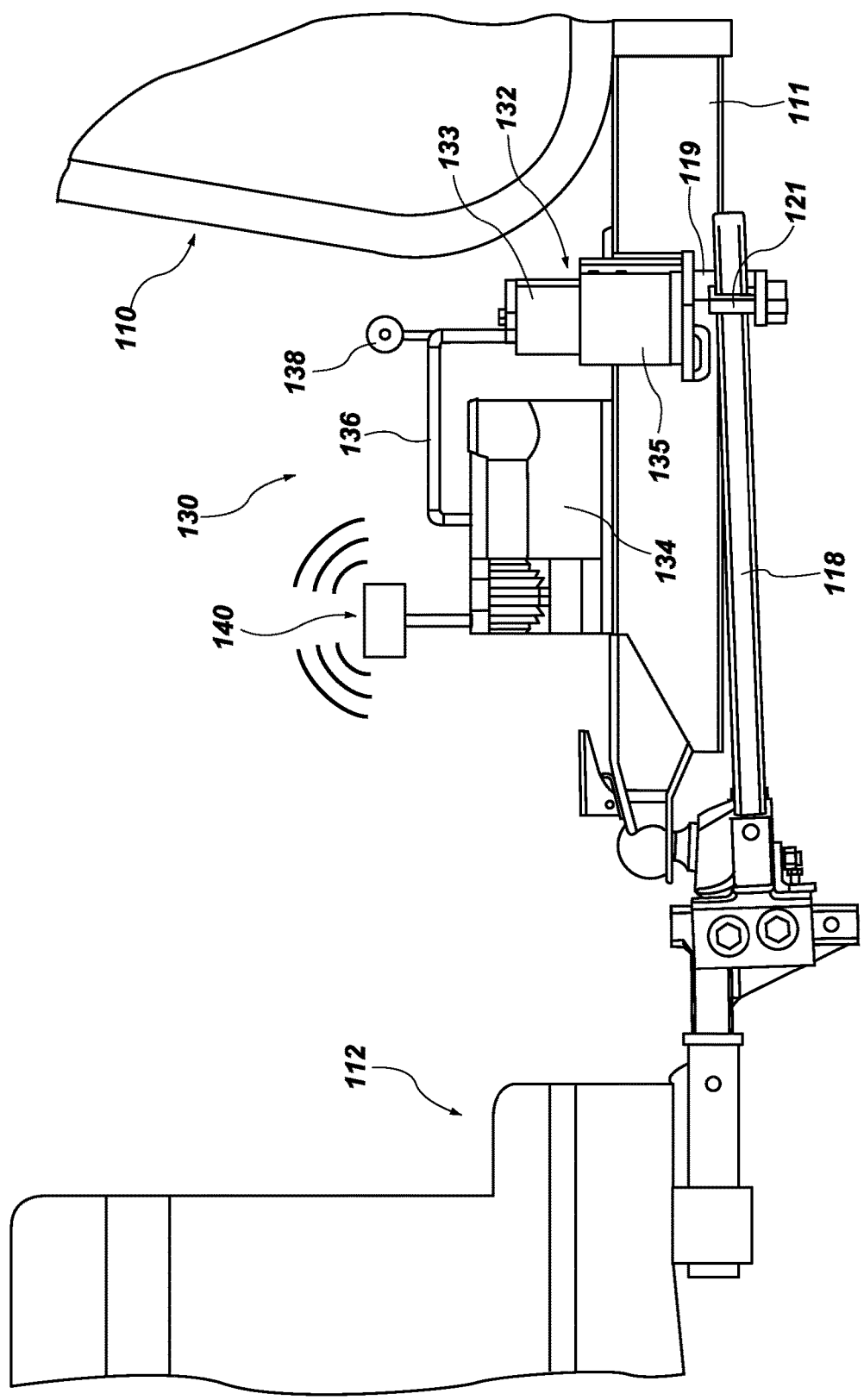
FIG. 6 is a perspective view of the disclosed weight distribution system.

FIGS. 4-6 illustrate another disclosed embodiment of a powered arm lifter or powered weight distribution system for facilitating a more even load on a tow vehicle. Specifically, FIG. 4 illustrates a trailer 110 and a tow vehicle 112. The trailer 110 may include a tongue 114 configured to receive a trailer hitch 116 attached to the tow vehicle 112. The trailer 110 may also include a trailer frame 111, and the tongue 114 may be attached to the trailer frame 111. The trailer hitch 116 may also include a weight distribution mechanism having at least one spring bar, or a pair of spring bars 118, designed and configured to engage or bias against corresponding spring bar mounts 119 to more evenly distribute the load from the trailer 110 over the axles of the tow vehicle 112, as opposed to placing all or most of the load of the trailer's tongue weight on the rear axle of the tow vehicle 112. The spring bar mounts 119 may be attached to or otherwise disposed on or confined to movement with the trailer frame 111. It is to be understood that the concept of the spring bar mounts 119 being disposed on the trailer 110 or trailer frame 111 shall be construed such that the phrase "disposed on" covers broadly the concept of spring bar mounts 119 being either directly attached to the trailer 110 or the trailer frame 111 or otherwise not directly attached to the trailer 110 or the trailer frame 111, but confined to movement with the trailer 110 or the trailer frame 111. It is to be further understood that the trailer 110 may include the trailer frame 111, it is also to be understood that the trailer 110 and the trailer frame 111 may be separate and distinct elements. FIG. 4 illustrates the trailer 110 and tow vehicle 112 before the trailer 110 has been loaded onto the tow vehicle 112. Also shown in FIG. 4 is that the tow vehicle 112 at a base line, meaning the chassis of the vehicle is substantially balanced between the front wheels 120, or front axle, and the rear wheels 122, or rear axle.

FIG. 4 also illustrates a spring bar or weight distribution actuator 130 that can be connected to each of the spring bar mounts 119 and configured to actuate or adjust the position of the spring bar mounts 119, in any desired direction, such as, for example, vertically, or substantially vertically, or up and down, or substantially horizontally, or at any other desired angle, such that when the spring bars 118 are engaged with the corresponding spring bar mounts 119, the weight distribution actuator 130 can bias or, increase or decrease, the pressure, or torque or force or load angle, on the spring bars 118 which may also change the amount of weight being distributed from the rear axle of the tow vehicle 112 to the front axle of the tow vehicle 112. In alternative embodiments also disclosed herein, the weight distribution actuator 130 may also be configured to bias, or apply torque, to the spring bars 118 in horizontal or substantially horizontal directions, or at any other desired angle between vertical and horizontal.

Additionally, as described in further detail below, it is to be understood that the mount actuator 132 can apply a force in any desired direction. Such an actuation may cause a repeatable, controllable change in the amount of weight distribution applied to the vehicle/trailer combinations.

As illustrated in FIGS. 4-6, the weight distribution actuator 130 may include a mount actuator 132 in fluid, mechanical, pneumatic, or electrical communication with a pressure actuator, or power source 134 that may be configured to provide power to and facilitate movement of the mount actuator 132, in a vertical or substantially vertical direction, or generally up and down. The weight distribution actuator 130 may be permanently or temporarily mounted to the trailer 110 and may be powered by any desired mechanism, such as a battery, fuel, or electrical power or other known or desired power source.

The mount actuator 132 may be an air bag mechanism that may include a bag or bellows 133, that when deflated, may be housed within a housing 135. The bellows 133 may be attached or secured to an end portion of the spring bar mount 119, such that as the bellows move up and down, during inflation and deflation of the bellows 133, the spring bar mount 119 with correspondingly also move up and down, substantially vertically. Accordingly, as the bellows 133 inflate, the mount actuator may actuate vertical movement of the spring bar mounts 119, with upward vertical movement being facilitated by increased pressure of the bellows 133 and downward vertical movement of the spring bar mounts 119 facilitated by reduced pressure within the bellows 133.

The mount actuator 132 may alternatively be any desired mechanism that can provide generally upward, downward, horizontal, or angular movement of the spring bar mounts 19, such as, for example, pneumatic, hydraulic, mechanical or electric powered piston or other vertical or horizontal actuation device or mechanism. Examples of additional or alternative pressure actuators and mount actuators are provided below with respect to FIGS. 7-10.

The power source 134 may be in fluid, mechanical or electrical communication with the mount actuator 132 via a pressure or power line 136. The pressure line 136, may for example, provide fluid pressure, such as air or hydraulic fluid for example, to the mount actuator 132 to actuate inflation of the bellows 133 which may facilitate the desired movement. The pressure line 136 may include a release valve 138, or dump valve or any other desired pressure or power release mechanism. The release valve 38 may be actuated to release air pressure, hydraulic pressure, or other desired power level, to adjust the mount actuator 132 to a lower pressure or power level, thereby lowering the position of the corresponding spring bar mount 119. The release valve 138 may be manually actuated or may be connected to an electric actuation system, such as a remote actuation system described in an additional embodiment below.

FIG. 5, illustrates the trailer 110 and tow vehicle 112 after the trailer 110 is loaded onto the tow vehicle 112, but before engagement of the spring bars or weight distribution mechanism 118. Also shown in FIG. 5 is the tow vehicle 112 in a loaded state, meaning the trailer hitch 116 and rear wheels 122 may be holding all or the substantial majority of the tongue weight of the trailer 110 and some of the load of from the front axle of the tow vehicle 112, causing the chassis of the vehicle 112 to substantially tilt toward the rear of the vehicle 112, causing the front of the vehicle 112 to raise up from the front wheels 120, or front axle.

FIG. 6 illustrates the trailer 110 and tow vehicle 112 after the trailer 110 is loaded onto the tow vehicle 112, and after engagement of the spring bars or weight distribution mechanism 118. Also shown in FIG. 6 is when the weight distribution mechanism 118 is engaged, the weight of the trailer 110 previous carried by the rear axle 122 is more evenly distributed over the axles of the chassis of the vehicle 112, resulting in the front of the chassis of the vehicle 112 to be closer to level with respect to the front wheels 120 and rear wheels 122.

The pressure or power line 136 may include a pressure or power sensor 138, or any other desired measurement device. The sensor 138 may monitor the operating status of the mount actuator 132, such as, air pressure, hydraulic pressure, linear displacement, or other desired attribute that may facilitate movement of the mount actuator 132.

The sensor 138 may be in communication with a logic unit 140 which may be configure to control the output of the weight distribution actuator 130 and more specifically the power source 134. The logic unit 140 may be programmed to turn on and off the power source 134 to increase or decease the pressure transferred to the mount actuator 132, thereby moving the mount actuator 132 vertically, up or down, to desired levels.

The sensor 138 can also continuously monitor and provide pressure or displacement levels of the mount actuator 132, which can indirectly provide a measurement of, either absolute or relative, weight distribution being provided by the spring bars 118 on the spring bar mounts 119. The communication between the sensor 138 and the logic unit 140 can be hardwired, or transmitted by electrical signal such as WiFi or bluetooth, for example. The pressure or power information provided by the sensor 138 may be used by the logic unit 140 to determine if the power source 134 should be activated to increase or decrease the pressure or power provided to the mount actuator 132 to move the mount actuator 132 vertically up or down, to compensate for changes in trailer load, driver or user preference, road condition, or to meet a desired target weight distribution.

As shown in FIG. 4, the disclosed weight distribution measurement system may also include a temporary or portable measuring device 150 or primary weight distribution sensor. The measuring device 150 may be electronic and configured to measure a linear distance between two objects or surfaces. The measuring device 150 may measure the linear distance by utilizing a laser, which may be visible, or infrared, ultrasonic waves, or other measurement device such as a tape measure, or any other known measuring implement. The measuring device 150 may also include an electronic memory capable of storing multiple measured distances. Additionally, the measuring device 150 may be configured to take a single or multiple measurements at a first location, or multiple locations, and load status and then average the measurements together to provide a more accurate final measurement for any given location and load status.

The measuring device 150 may also include an operating system capable of being programed to perform calculations utilizing the stored measured distances. The measuring device 150 may also include a visual display, that may display measured distances, weight distribution status, and/or resultant calculations. Additionally, the measuring device may be configured to transmit or share data to the logic unit 140, such as measured distances and/or output calculations, via WiFi, RF, Bluetooth, hardwire or other known electronic transmission mechanism or device.

Alternatively, as shown in FIG. 4, the measuring device may be configured to transmit or share data to a remote device 160, such as measured distances and/or output calculations, via WiFi, RF, Bluetooth, hardwire or other known electronic transmission mechanism or device. The remote device 160 may also be, for example a phone, tablet, computer, or other desired device with wireless connectivity capabilities.

The remote device 160 may also include an operating system capable of being programed to perform calculations utilizing the stored measured distances. The remote device 160 may also include a visual display, that may display measured distances or resultant calculations. Additionally, the measuring device may be configured to transmit or share data to the measurement device 150 and with the logic unit 140, such as measured distances and/or output calculations, via WiFi, RF, Bluetooth, hardwire or other known electronic transmission mechanism or device.

The remote device 160 may enable a user to receive weight distribution or ride height measurements, or other desired measurements from the measurement device 150, and then transmit or share this information with the logic unit 140, which can then actuate the power source 134 and mount actuator until the desired weight distribution measurements are obtained. Alternatively, a user can manually measure the ride height or weight distribution without the measurement device and actuate the power source 134 and mount actuator 132 via the logic unit, by simply sending an activation signal from the remote device 160 to the logic unit 140.

A disclosed method of measuring weight distribution may include using the portable measuring device 150 to measure and store a first measurement of the tow vehicle, which may be a baseline measurement of the front axle load of the unloaded tow vehicle 112, such as two points or surfaces that may represent the height of a front end of the tow vehicle 112. After the tow vehicle 112 has been loaded with a trailer 110, but before the weight distribution mechanism 118 is engaged, a second measurement may be taken and stored by the portable measuring device 150. The second measurement is taken at substantially the same location and between the same two points or surfaces as the first measurement.

After the weight distribution mechanism 118 is engaged, a third measurement may be taken and stored by the portable measuring device 150. The third measurement is taken at substantially the same location and between the same two points or surfaces as the first and second measurements.

The portable measuring device 150 may then calculate a percentage of the weight being distributed over the axles of the tow vehicle 112, also known as percent weight distribution.

It is to be understood that the portable measuring device 150 may operate to measure, calculate, or otherwise determine weight distribution as described above, also known as percent weight distribution, regardless of whether portable measuring device 150 utilizes an actual weight measurement of the vehicle 112 or otherwise determines weight distribution without utilizing a weight measurement of vehicle 112 and instead measuring, calculating or determining the weight distribution in some other way, such as, for example, comparing vertical measurement distances and proportionalizing or otherwise relating those measurements to the weight of the vehicle 112 as it is loaded and unloaded. As another example, the vehicle's ride height can be directly related to trailer tongue weight or weight distribution, or weight distribution measurement, such that measuring or determining the weight distribution, or utilizing some proportional representation of the weight distribution, can be accomplished by measuring differences in the vehicle's ride height as the trailer 110 is loaded or unloaded and utilizing differences in the vehicles ride height to represent changes in distribution of the rear axle 122 weight to additional axles of the tow vehicle 112. Weight distribution may also be measured by measuring a downward force exerted on trailer hitch, such as a hitch ball, or by measuring the tow vehicle 112 pitch angle, or any other desired method of measuring weight distribution.

After the portable measuring device 150 performs the percent weight distribution, the portable measuring device 150 may then display or communicate to the remote device 160 which can then communicate to the logic unit 140, the percent weight distribution or otherwise provide communication that indicates the weight distribution is correct or at a desired predetermined level. The communication between the measurement device 150, the remote device 160 and the logic unit 140, can be via Bluetooth, RF, WiFi, or wired connection. Alternatively, the portable measuring device 150 may also, or instead, calculate and display a factor or amount of weight being distributed. The measuring device 150 may alternatively utilize optical, radial, linear, load cell, LVDT, string-pot, rod-pot, laser sonic, tilt, accelerometers, or any other desired mechanism to measure the load on the front axle of the tow vehicle 112.

It is to be understood that the portable measuring device 150 may, if desired, be disposed on, in, or in association with, the tow vehicle 112, as shown in FIG. 4, but that said portable measuring device 150 may not necessarily be connected directly, or at all, to the tow vehicle 112. For example, the portable measuring device 150 could be part of a sensing module disposed on trailer 110 or trailer frame 111, or anywhere that would enable said portable measuring device 150 to operate as intended. As noted above, the portable measuring device 150 may also be referred to herein as weight distribution sensor 150. It is to be further understood that the phrase "a weight distribution sensor disposed in association with the tow vehicle" as used herein, shall be construed broadly to cover the concept of any connection between the portable measuring device 150 and the tow vehicle 112 regardless of whether the portable measuring device 150 is attached to the tow vehicle 112 or instead associated with the tow vehicle 112 by measuring or determining weight distribution of the trailer tongue weight onto the tow vehicle 112 or its axles without being attached to the tow vehicle 112, but being in communication with or in association with the tow vehicle 112.

When a desired spring bar mount 119 position is achieved, the user or the logic unit 140 can disengage or turn off the power source 134, which can then freeze or substantially hold steady the pressure or power provided to the mount actuator 132, thereby holding the mount actuator 132 and corresponding spring bar mount 119 in position. When a user would like to lower the position of the spring bar mount 119, the user or logic unit can then simply activate the pressure release valve 138, which can then reduce the pressure or power to the mount actuator 132, which can then lower the spring bar mount 119. This actuation of the power source 134 and/or pressure release valve 138 can occur while the spring bar 118 is engaged with the spring bar mount 119. The actuation of the power source can also include opening a valve or other mechanism to allow pressurized fluid into air bags from a reservoir or tank.

The spring bar mount 119 may also include a retention pin 121, that may be inserted or engaged with an end portion of the spring bar mount 119, such that the spring bar 118 may be retained between the retention pin 121 and the spring bar mount 119. The spring bar mount 119 may also include lock mechanism, or locking pin, that my be engaged, such that when the spring bar mount 119 is in a desired position, a user can lock the spring bar mount 119 in place, independent of the pressure or power levels of the mount actuator 132. This lock mechanism can be utilized to reduce or prevent bleed off of pressure or power in the mount actuator 132 and can also reduce wear and tear or other deterioration of the mount actuator 132 and/or power source 134 because these mechanisms may not need to maintain the pressure or power during use.

Additionally, the mount actuator 132 may yield the benefit of creating or facilitating a damping system, as the vehicle 112 and trailer 110 are traveling or in use the pressure or power in the mounting actuator 132 can absorb, at least in part, small fluctuations in changes in weight distribution or loads, for example, when traveling over rocks, pot holes, or other obstructions in a road than may cause temporary fluctuations in weight distribution.

FIGS. 7-10 are disclosed to illustrate and enable alternative power sources and mount actuators that may be used or substituted into the disclosed weight distribution systems of FIGS. 1-3 and FIGS. 4-6. Accordingly, details of the peripheral features of the weight distributions systems disclosed in FIGS. 1-6 will not be reiterated here, but one skilled in the art will understand, for example, that the power sources and mount actuators disclosed in FIGS. 7-10 can be substituted into the weight distribution systems disclosed in FIGS. 1-6, while still maintaining the same or substantially the same output and/or weight distribution adjustability. For example switch 37 and/or logic unit 140 may be configured and incorporated into the disclosed weight distribution systems of FIGS. 7-10 in the same or substantially the same way these features are utilized and incorporated in the embodiments disclosed in FIGS. 1-6 respectively.

Figure 7:
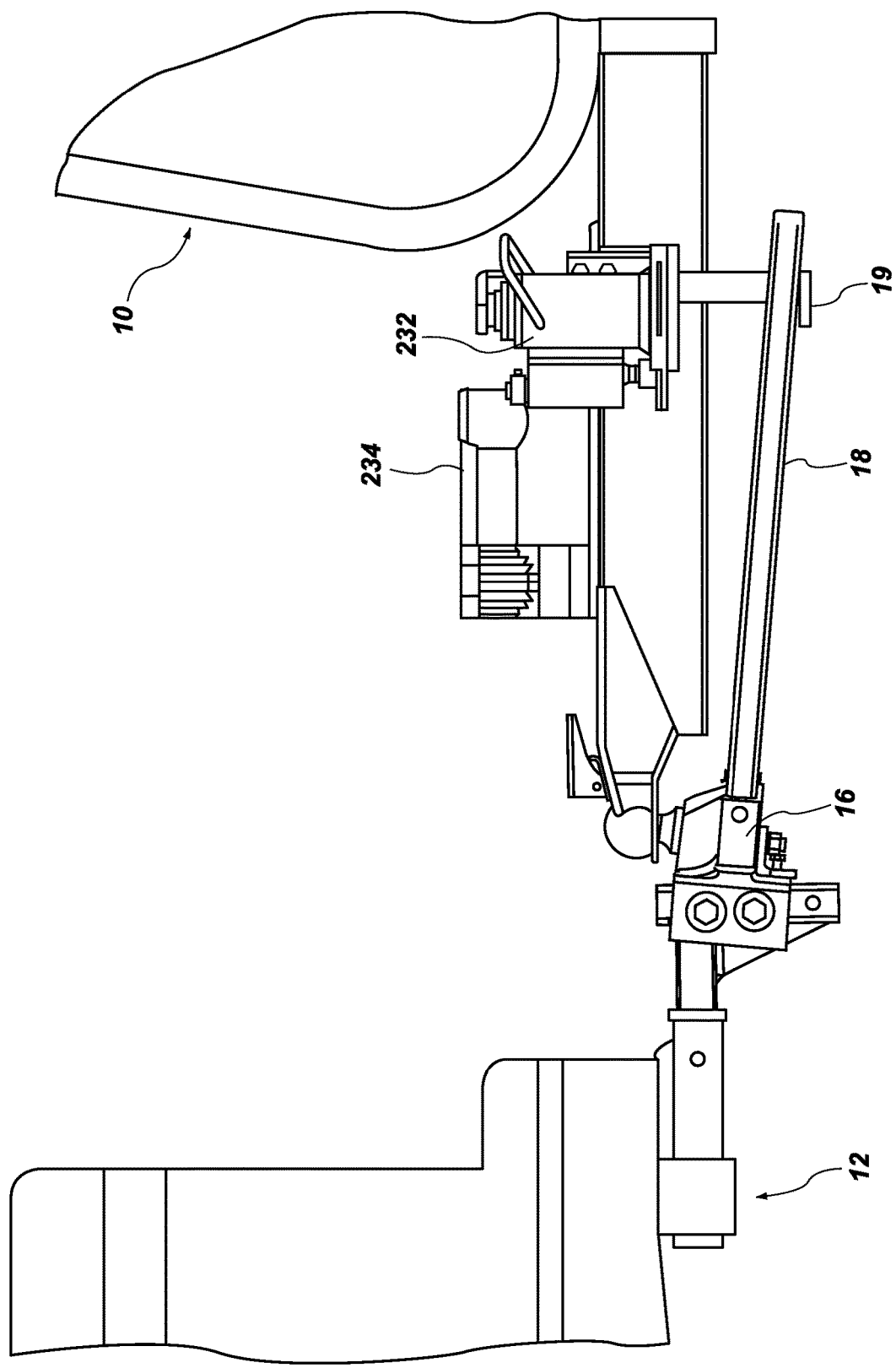
FIG. 7 is a perspective view of another disclosed weight distribution system.

As shown in FIG. 7, a power source 234 can be an hydraulic pump that may provide power or pressure to a mount actuator 232 to facilitate movement of the corresponding spring bar mount 19, as similarly shown with respect to the power source 34 and 134 disclosed above. The mount actuator 232 may include an hydraulic piston that may operate and facilitate movement of the spring bar mount 19 in substantially the same was as mount actuator 32 and 132.

Figure 8:
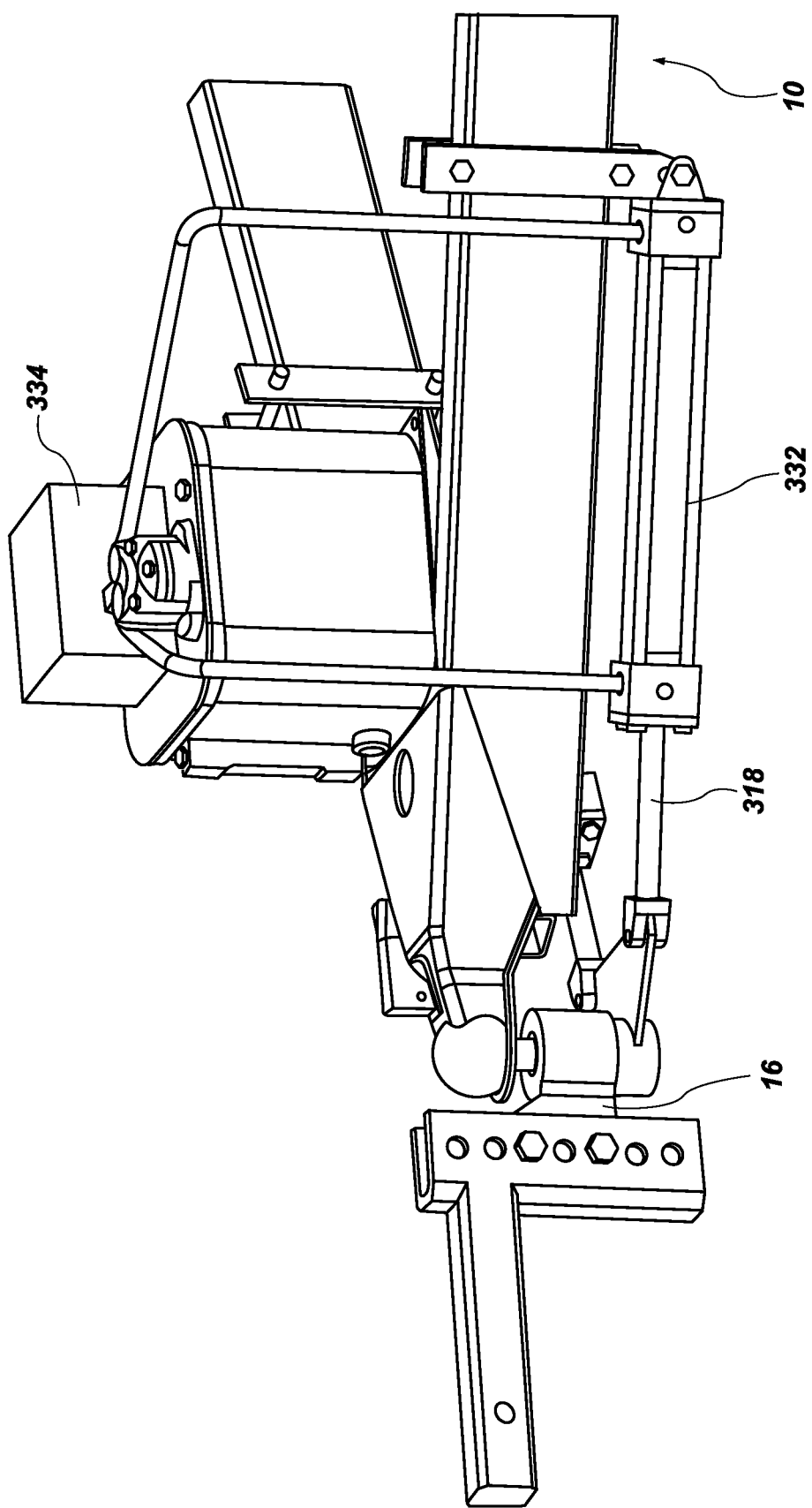
FIG. 8 is a perspective view of another disclosed weight distribution system.

As shown in FIG. 8, a power source 334 can be an hydraulic pump that may provide power or pressure to a horizontal mount actuator 332 to facilitate movement of the corresponding linear actuator 318, which can increase or decrease bias or torque on the hitch 16, providing and actuating weight distribution to the tow vehicle, not shown.

Figure 9:
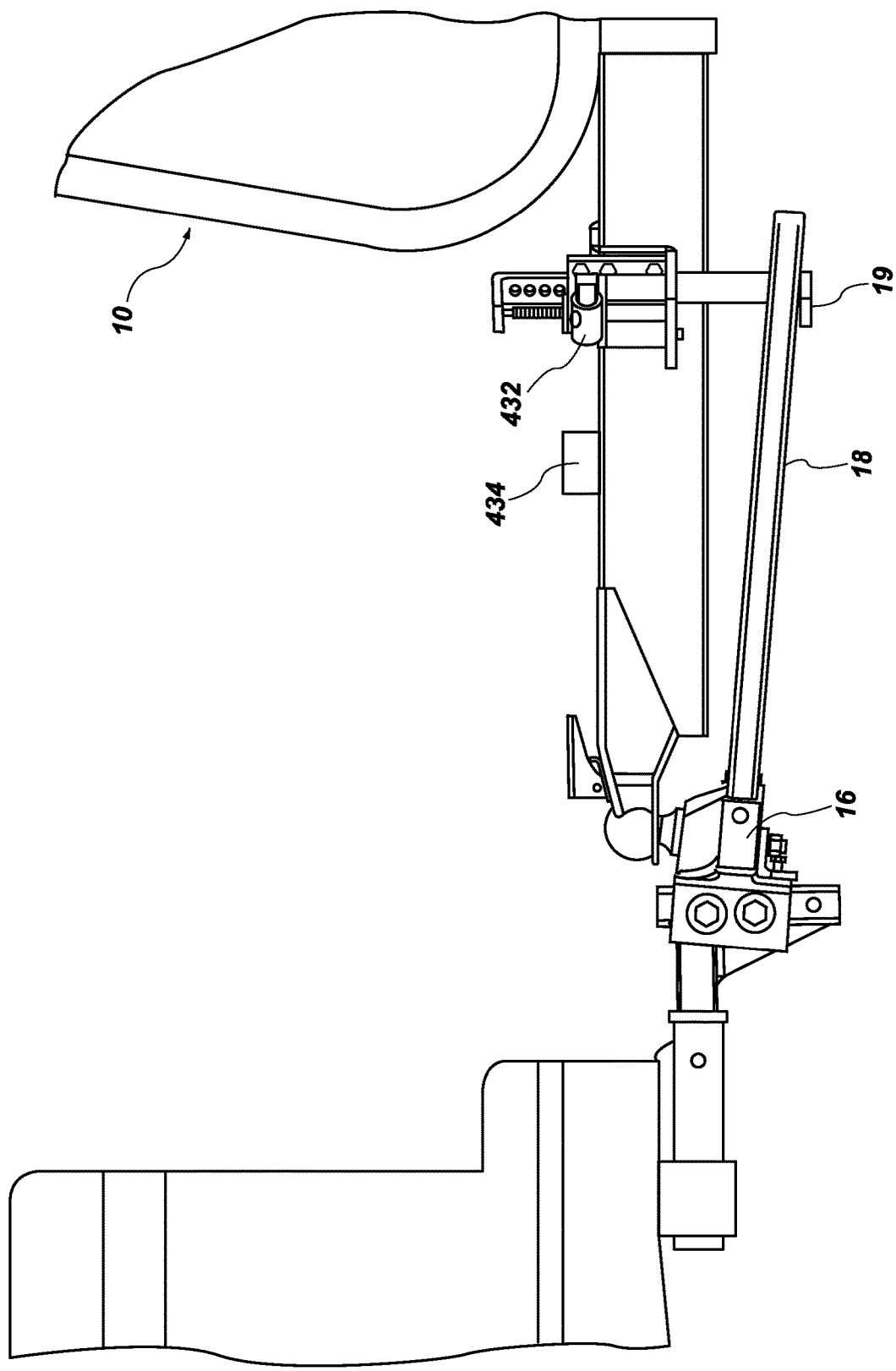
FIG. 9 is a perspective view of another disclosed weight distribution system.

As shown in FIG. 9, a power source 434 can be a battery, generator, alternator, vehicle power system, or other desired power system that may provide power to actuate a mount actuator 432, such as a screw lift, to facilitate movement of the corresponding spring bar mount 19.

Figure 10:
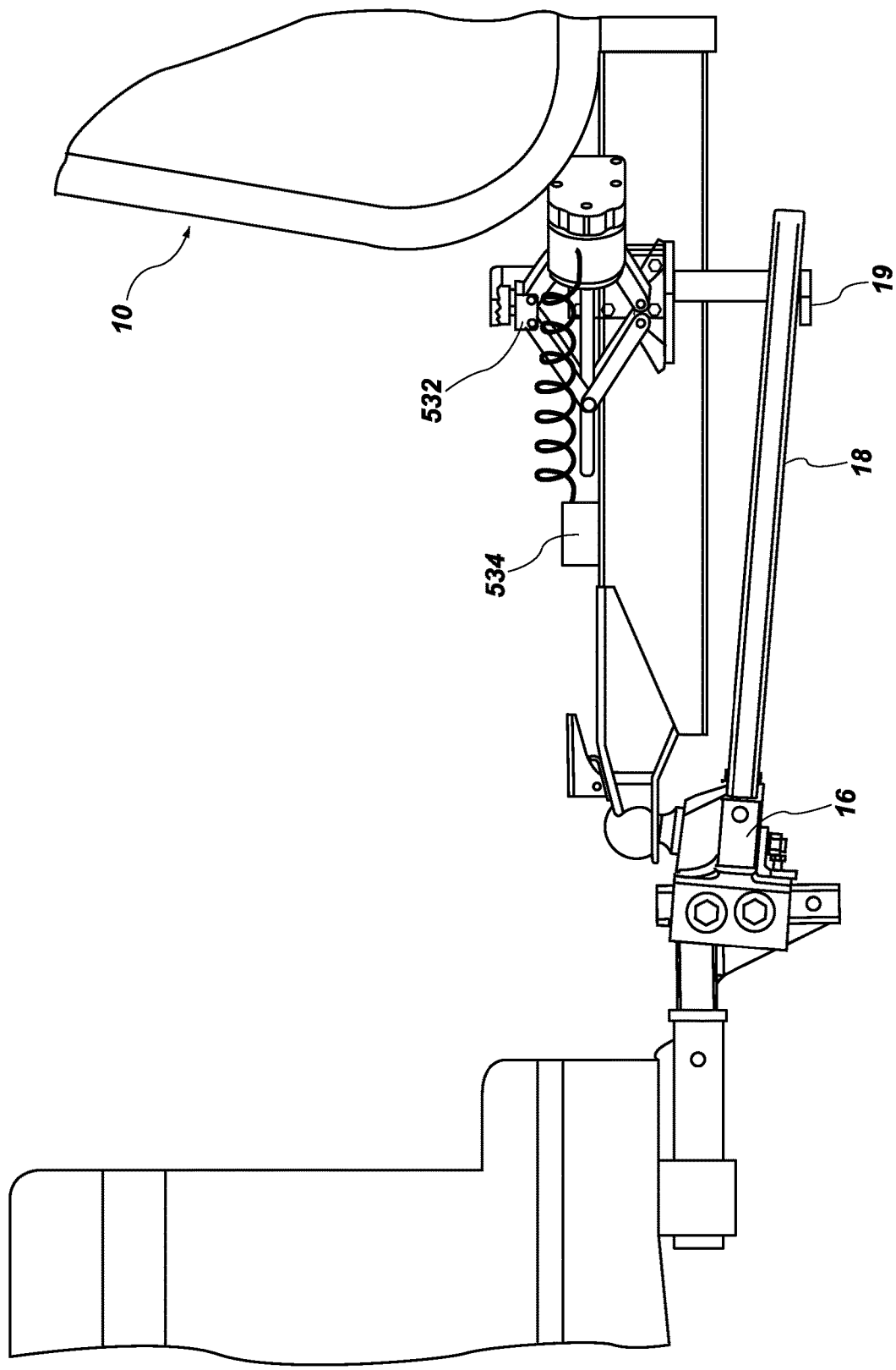
FIG. 10 is a perspective view of another disclosed weight distribution system.

As shown in FIG. 10, a power source 534 can be a battery, generator, alternator, vehicle power system, or other desired power system that may provide power to actuate a mount actuator 532, such as a scissor lift, to facilitate movement of the corresponding spring bar mount 19.

Figure 11:
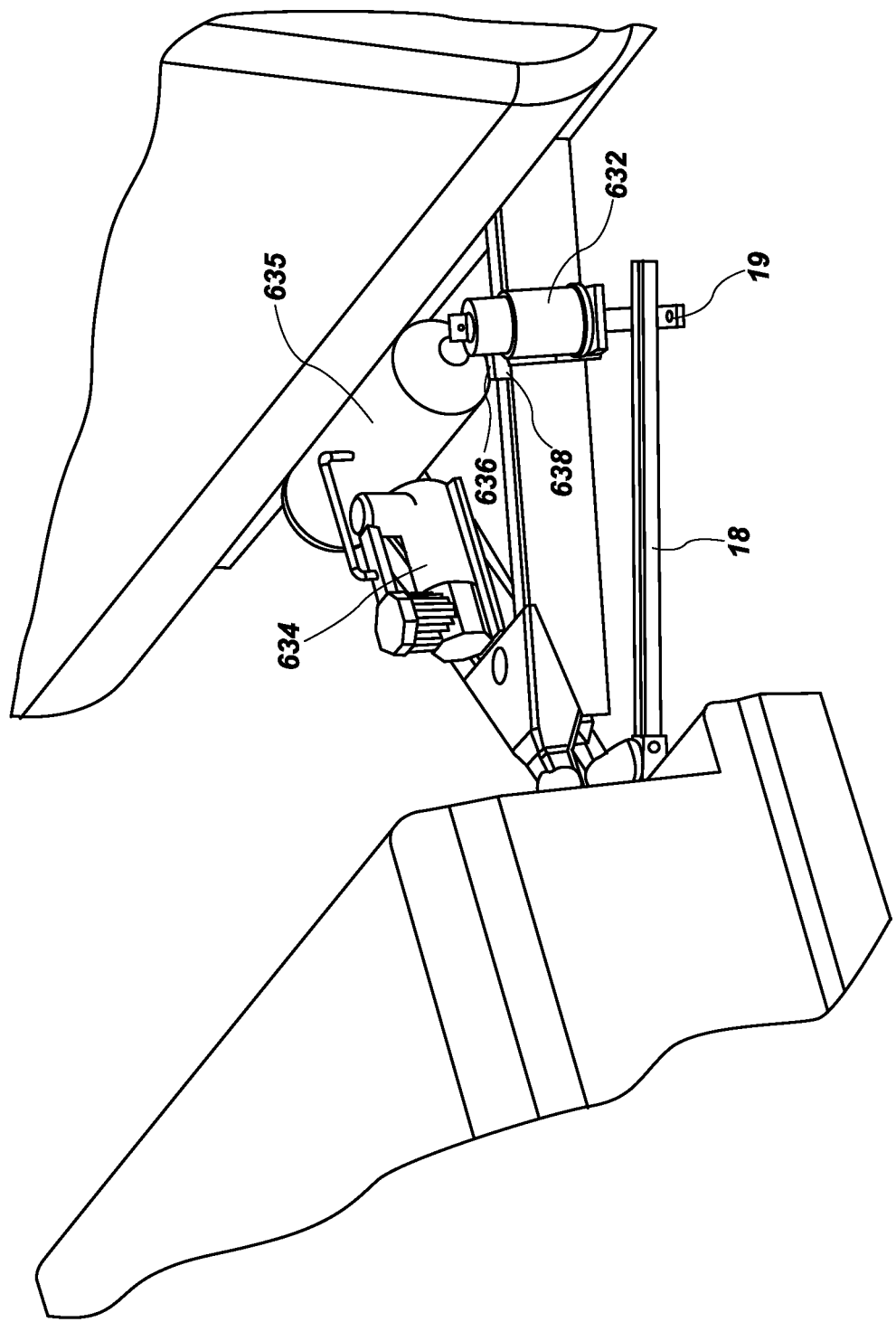
FIG. 11 is a perspective view of another disclosed weight distribution system.

As shown in FIG. 11, a power source 634 can be an air compressor or pump, or other desired power system that may provide pressurized air to a tank 635 which can then provide pressurized air to, and actuate, an air bag actuator 632, to facilitate movement of the corresponding spring bar mount 19. In operation, the power source 634 may turn of whenever air pressure within the tank 635 falls below a predetermined set point. The power source 634 can function independent of the pressure of the air bag actuator 632 and may only activate when necessary to maintain the air pressure in the tank 635 at the desired set point. A pressure valve 636 may be in communication with the air bag actuator 632 such that, when the pressure valve 636 is actuated, high pressure air from the tank 635 is allowed to enter the air bag actuator 632 which would, in turn raise the spring bar mount 19 and increase the weight distribution for the vehicle. A relief valve 638 may also be in communication with the air bag actuator 632, such that when the relief valve 638 is activated, the pressure in the air bag actuator 632 may be reduced, respectively lowering the spring bar mount 19 and decrease the weight distribution of the vehicle.

Figure 12:
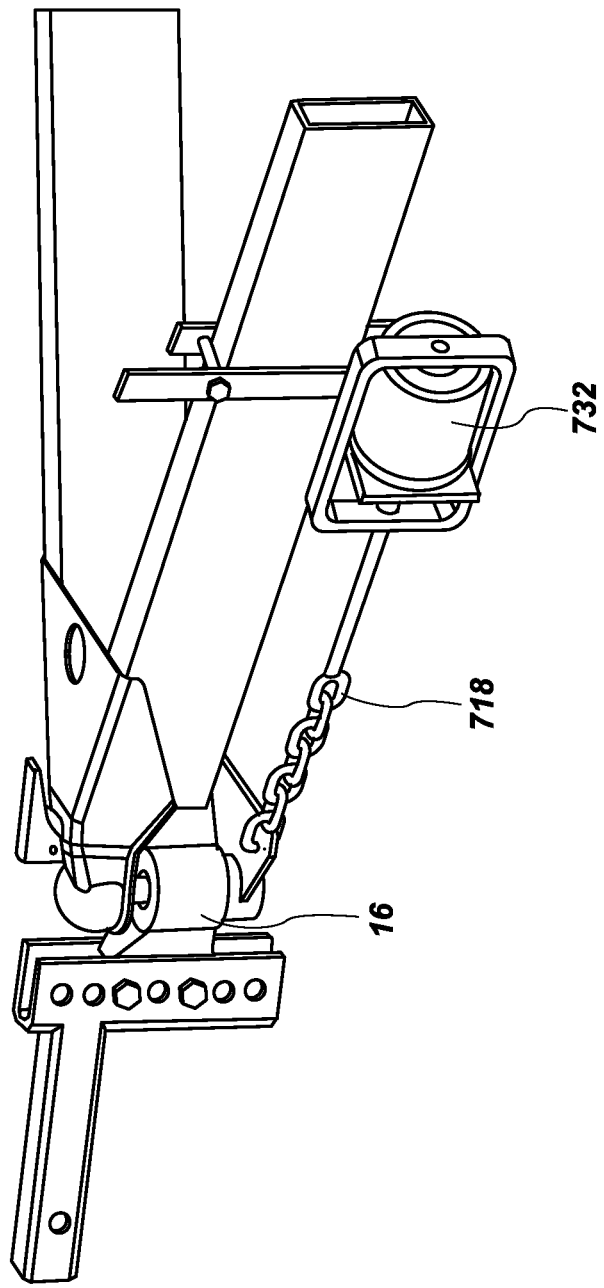
FIG. 12 is a perspective view of another disclosed weight distribution system.

As shown in FIG. 12, this embodiment is compatible with (although not shown) the power source 634, tank 635 and valves 636 and 638, and may be actuated in the same manner as described above with respect to the embodiment disclosed in FIG. 11. As such, the tank 634 may communicate with and actuate a horizontal air bag actuator 732, which can facilitate movement of a corresponding chain 718 connected to the hitch 16. As the air bag actuator 732 is activated the chain 718 is pulled which applies tension on the hitch 16 and thereby increase the weight distribution of the tow vehicle (not shown). In alternative embodiments, the disclosed horizontal air bag actuator 732 and corresponding system of components could by used on both sides of a trailer, or as a single actuator on a center position of the trailer, thus pulling straight back from the hitch 16.

Figure 13:
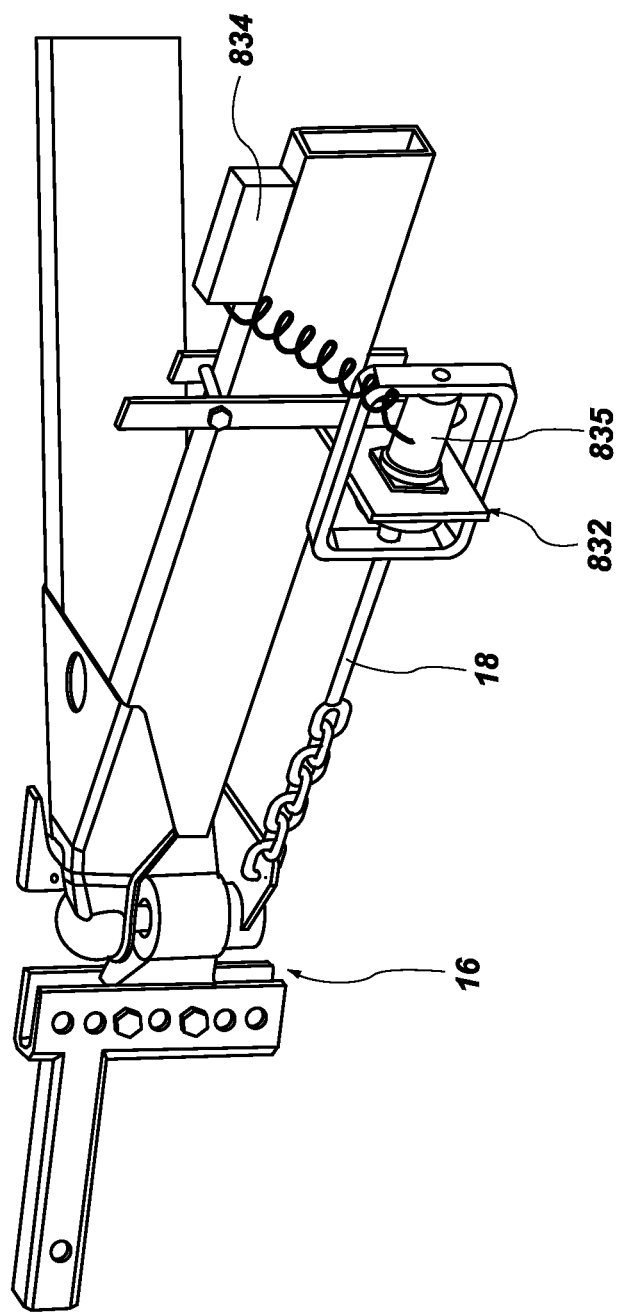
FIG. 13 is a perspective view of another disclosed weight distribution system.

As shown in FIG. 13, a power source 834 can be an hydraulic pump that may provide power or pressure to a horizontal mount actuator 832 to facilitate movement of a chain 818 by pushing a linear actuating ram 835, which can increase or decrease bias or torque on the hitch 16, providing and actuating weight distribution to the tow vehicle, not shown.

Figure 14:
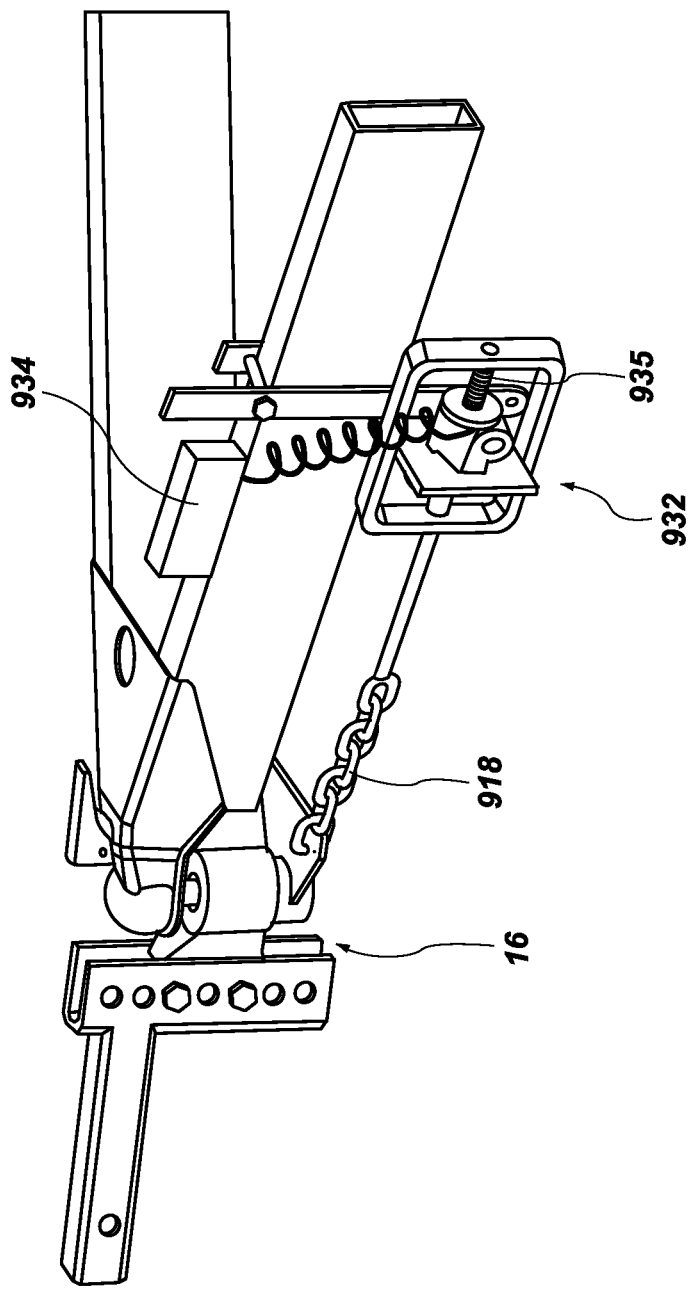
FIG. 14 is a perspective view of another disclosed weight distribution system.

As shown in FIG. 14, a power source 934 can be a battery, generator, alternator, vehicle power system, or other desired power system that may provide power or pressure to a horizontal mount actuator 932, or screw actuator, to facilitate movement of a chain 918 by rotating a linearly actuating screw 935, which can increase or decrease bias or torque on the hitch 16, providing and actuating weight distribution to the tow vehicle, not shown. Alternatively, the screw actuator 932 may be inverted without typical tension rings and the chain 918 may be attached directly to the actuating screw 935 with a swivel at the end so the screw actuator 935 can pull the chain 918 in tension, directly.

Figure 15:
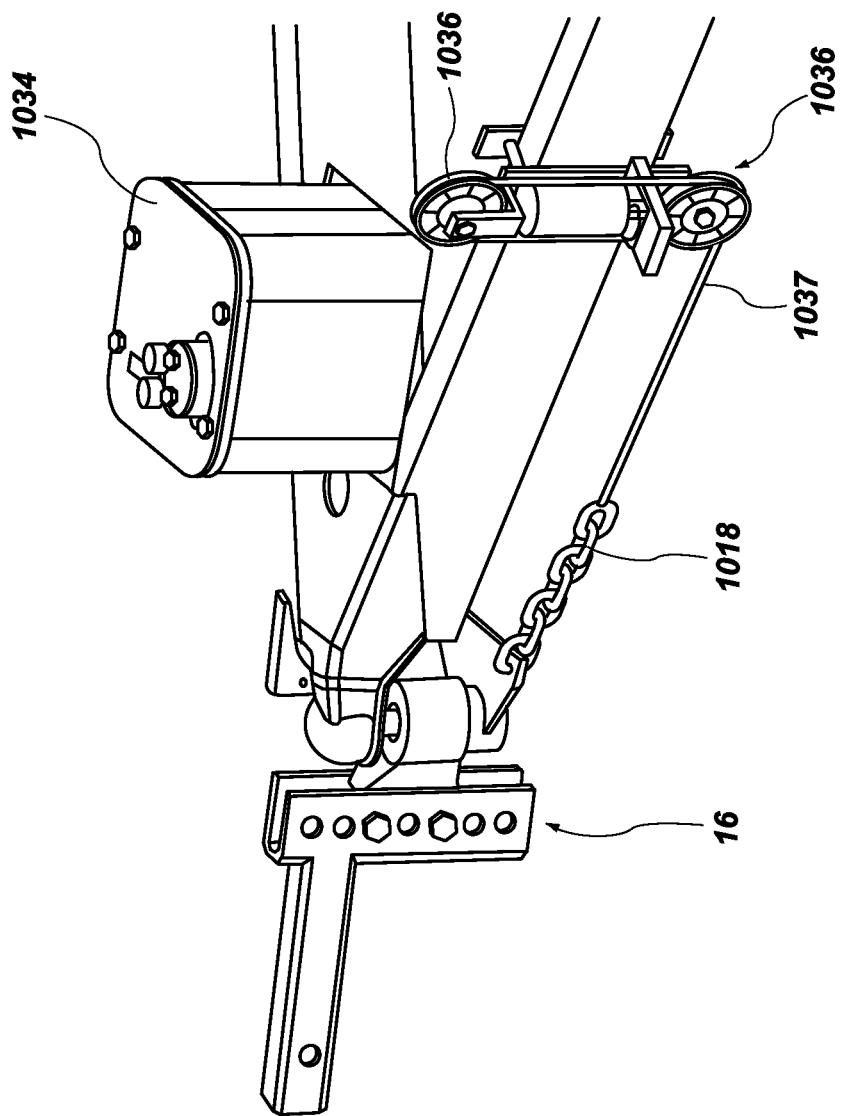
FIG. 15 is a perspective view of another disclosed weight distribution system.

As shown in FIG. 15, a power source 1034 can be an hydraulic pump that may provide power or pressure to an actuator 1032 connected a pulley system 1036. The pulley system 1036 may receive a cord 1037 connected to a chain 1018. As the actuator raise a top pulley 1036a of the pulley system 1036, tension increases in the cord 1037 which correspondingly increases the tension on the chain 1018, which can increase or decrease bias or torque on the hitch 16, providing and actuating weight distribution to the tow vehicle, not shown. The pulley system 1036 can provide a mechanical advantage, for example a 1:2 displacement advantage, in a tighter or more compact space, which may be advantageous for hydraulic or pneumatic systems. Additionally, similar pulley systems or pulley configurations can be used to increase the mechanical advantage of other disclosed embodiments, including actuating spring bar mounts 19.

Each of the power sources 234, 334, 434, 534, 634, 734, 834, 934 and 1034 disclosed above may be configured to incorporate logic unit 140 as described herein with respect to FIGS. 4-6, to activate the respective power sources 234, 334, 434, 534, 634, 734, 834, 934 and 1034 according to the method described above.

The term "measurement device," as used herein, shall each be construed broadly to cover any device, now known or later discovered, capable of measuring, or determining a linear distance.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim.

Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for powered trailer weight distribution, comprising:
   a hitch mount having a spring bar;
   a trailer;
   a spring bar mount disposed on the trailer and having an initial position relative to the trailer, wherein the spring bar mount is configured to receive and engage the spring bar;
   a weight distribution actuator configured and arranged to adjust a position of the spring bar mount relative to the spring bar while engaged with the spring bar, wherein the weight distribution actuator is connected to a power source that provides power to the weight distribution actuator, facilitating the adjustment of the position of the spring bar mount; and
   a sensor configured to identify a status of the weight distribution actuator;
   wherein the weight distribution actuator is further configured to adjust a position of the spring bar mount based at least on the identified status of the weight distribution actuator.

2. The system of claim 1, further comprising:
   a remote device in communication with the weight distribution actuator, wherein the remote device is configured to activate the weight distribution actuator.

3. The system of claim 2, wherein the weight distribution actuator includes a logic unit configured to receive information from the remote device.

4. The system of claim 3, wherein remote device wirelessly communicates with the logic unit.

5. The system of claim 3, wherein the remote device is hardwired to the logic unit.

6. The system of claim 3, wherein the sensor configured to identify a status of the weight distribution actuator is configured to communicate the status to the logic unit; and the logic unit is configured to transmit the status to the remote device.

7. The system of claim 1, wherein the weight distribution actuator is pneumatic.

8. The system of claim 1, wherein the weight distribution actuator is hydraulic.

9. The system of claim 1, wherein the weight distribution actuator is electric.

10. The system of claim 1, wherein the weight distribution actuator is mechanical.

11. A system for powered trailer weight distribution, comprising:
    a hitch mount having a spring bar;
    a trailer;
    a spring bar mount disposed on the trailer and having an initial position relative to the trailer, wherein the spring bar mount is configured to receive and engage the spring bar; and
    a weight distribution actuator configured and arranged to adjust a position of the spring bar mount relative to the spring bar while engaged with the spring bar;
    a remote device in communication with the weight distribution actuator, wherein the remote device is configured to activate the weight distribution actuator; and
    a sensor configured to identify a status of the weight distribution actuator;
    wherein the weight distribution actuator is further configured to adjust a position of the spring bar mount based at least on the identified status of the weight distribution actuator.

12. The system of claim 11, wherein the weight distribution actuator is connected to a power source that provides power to the weight distribution actuator, facilitating the adjustment of the position of the spring bar mount.

13. The system of claim 12, wherein the weight distribution actuator includes a logic unit configured to receive information from the remote device.

14. The system of claim 13, wherein remote device wirelessly communicates with the logic unit.

15. The system of claim 13, wherein the remote device is hardwired to the logic unit.

16. The system of claim 13, wherein the sensor configured to identify a status of the weight distribution actuator is configured to communicate the status to the logic unit; and the logic unit is configured to transmit the status to the remote device.

17. The system of claim 11, wherein the remote device is configured to turn off the weight distribution actuator.

18. The system of claim 11, wherein the weight distribution actuator is pneumatic.

19. The system of claim 11, wherein the weight distribution actuator is hydraulic.

20. The system of claim 11, wherein the weight distribution actuator is electric.

21. The system of claim 11, wherein the weight distribution actuator is mechanical.

22. A method of powered trailer weight distribution, comprising:
    providing a hitch mount and a spring bar, wherein the spring bar is disposed on the hitch mount;
    providing a trailer;
    providing a spring bar mount disposed on the trailer, wherein the spring bar mount has an initial position relative to the trailer, and wherein the spring bar mount is configured to receive and engage the spring bar;
    providing a weight distribution actuator that can adjust a position of the spring bar mount while engaged with the spring bar;
    providing a power source connected to the weight distribution actuator, wherein the power source provides power to the weight distribution actuator, facilitating the adjustment of the position of the spring bar mount;
    engaging the spring bar with the spring bar mount;
    activating the weight distribution actuator;
    identifying, by a sensor, a status of the weight distribution actuator; and
    adjusting the position of the spring bar mount using the weight distribution actuator based at least on the identified status of the weight distribution actuator.

23. The method of claim 22, wherein the weight distribution actuator is connected to a power source that provides power to the weight distribution actuator, facilitating the adjustment of the position of the spring bar mount, and a remote device in communication with the weight distribution actuator, wherein the remote device is configured to activate the weight distribution actuator.

24. The method of claim 23, wherein the weight distribution actuator includes a logic unit configured to receive information from the remote device.

25. The method of claim 24, wherein the remote device wirelessly communicates with the logic unit.

26. The method of claim 24, wherein the remote device is hardwired to the logic unit.

27. The method of claim 24, wherein the sensor configured to identify a status of the weight distribution actuator is configured to communicate the status to the logic unit; and the logic unit is configured to transmit the status to the remote device.

28. The method of claim 22, further comprising a remote device in communication with the weight distribution actuator, wherein the remote device is configured to turn off the weight distribution actuator.

29. The method of claim 22, wherein the weight distribution actuator is pneumatic.

30. The method of claim 22, wherein the weight distribution actuator is hydraulic.

31. The method of claim 22, wherein the weight distribution actuator is electric.

32. The method of claim 22, wherein the weight distribution actuator is mechanical.

33. A system for powered trailer weight distribution, comprising:
   a hitch mount having a spring bar;
   a trailer;
   a spring bar mount disposed on the trailer and having an initial position relative to the trailer, wherein the spring bar mount is configured to receive and engage the spring bar;
   a weight distribution actuator configured and arranged to adjust a position of the spring bar mount relative to the spring bar while engaged with the spring bar, wherein the weight distribution actuator is connected to a power source that provides power to the weight distribution actuator, facilitating the adjustment of the position of the spring bar mount, and wherein the weight distribution actuator is pneumatic;
   a sensor configured to identify a status of the weight distribution actuator; and
   a remote device in communication with the weight distribution actuator, wherein the remote device is configured to activate the weight distribution actuator, and wherein the weight distribution actuator includes a logic unit configured to receive information from the remote device, and wherein the remote device wirelessly communicates with the logic unit;
   wherein the weight distribution actuator is further configured to adjust a position of the spring bar mount based at least on the identified status of the weight distribution actuator.

* * * * *